(12) United States Patent
Schnieders et al.

(10) Patent No.: US 12,423,671 B2
(45) Date of Patent: Sep. 23, 2025

(54) METHODS AND SYSTEM FOR OPERATING A MOBILE POINT-OF-SALES APPLICATION USING A SIM

(71) Applicant: Deutsche Telekom AG, Bonn (DE)

(72) Inventors: Dominik Schnieders, Aachen (DE); Stephan Spitz, Karlsfeld (DE); Hermann Geupel, Munich (DE)

(73) Assignee: DEUTSCHE TELEKOM AG, Bonn (DE)

(*) Notice: Subject to any disclaimer, the term of this patent is extended or adjusted under 35 U.S.C. 154(b) by 191 days.

(21) Appl. No.: 17/867,697

(22) Filed: Jul. 19, 2022

(65) Prior Publication Data

US 2023/0024227 A1    Jan. 26, 2023

(30) Foreign Application Priority Data

Jul. 22, 2021   (EP) .................................. 21 187 287

(51) Int. Cl.
    *G06Q 20/32*        (2012.01)
    *G06Q 20/34*        (2012.01)
    (Continued)

(52) U.S. Cl.
    CPC ..... *G06Q 20/3223* (2013.01); *G06Q 20/3278* (2013.01); *G06Q 20/3563* (2013.01);
    (Continued)

(58) Field of Classification Search
    CPC ................................................ G06Q 20/3223
    (Continued)

(56) References Cited

U.S. PATENT DOCUMENTS 5,544,246 A *   8/1996   Mandelbaum ...... H04L 63/0869
                                                    713/172
6,005,942 A *   12/1999   Chan .................. G06Q 20/3552
                                                    713/172
(Continued)

FOREIGN PATENT DOCUMENTS

EP         2876592 A1 *   5/2015             G06Q 20/20
EP         2820601 B1    10/2021
(Continued)

OTHER PUBLICATIONS

• ETSI. "Smart Cards; UICC—Contactless Front-end (CLF) Interface." (Aug. 7, 2018). Retrieved online Mar. 10, 2025. https://www.etsi.org/deliver/etsi_ts/102600_102699/102613/12.00.00_60/ts_102613v120000p.pdf (Year: 2018).*

(Continued)

*Primary Examiner* — James A Reagan
(74) *Attorney, Agent, or Firm* — LEYDIG, VOIT & MAYER, LTD.

(57) ABSTRACT

A method for operating a mobile Point-of-Sales (mPOS) application for executing a transaction includes: a Universal Integrated Circuit Card (UICC) card connected to a terminal device executes in interaction with the terminal device an application frontend of the mPOS application that provides, upon launch, an I/O interface with a human machine interface displayed by a touchscreen of the terminal device and a machine-to-machine interface; and the application frontend, for starting a transaction, captures transaction data associated with the transaction to be started via the human machine interface, reads further transaction data via the machine-to-machine interface from a transaction device separate from the terminal device and arranged close to the terminal device, generates a transaction authorization authorizing the requested transaction, and transmits the transac- (Continued)

tion authorization, the transaction data and the further transaction data via a connection to a remote backend server for completing the transaction.

14 Claims, 1 Drawing Sheet

(51) Int. Cl.
  *G06Q 20/38* (2012.01)
  *G06Q 20/40* (2012.01)
(52) U.S. Cl.
  CPC ....... *G06Q 20/3829* (2013.01); *G06Q 20/401* (2013.01); *G06Q 2220/00* (2013.01)
(58) Field of Classification Search
  USPC .......................................................... 705/71
  See application file for complete search history.

(56) References Cited

U.S. PATENT DOCUMENTS

| | | | | |
|---|---|---|---|---|
| 8,768,250 | B2* | 7/2014 | Ma | H04W 4/80 |
| | | | | 455/41.3 |
| 10,489,774 | B2* | 11/2019 | Zarakas | G06Q 20/4016 |
| 10,825,017 | B1* | 11/2020 | Johnson | G06Q 20/341 |
| 11,018,724 | B2* | 5/2021 | Xie | G06Q 20/3572 |
| 11,064,343 | B2* | 7/2021 | Dos Santos | H04W 76/10 |
| 11,494,756 | B2* | 11/2022 | Gueorguiev | G06Q 20/405 |
| 12,198,125 | B2* | 1/2025 | Wilson | G06Q 20/308 |
| 2012/0021683 | A1* | 1/2012 | Ma | H04L 63/0876 |
| | | | | 235/492 |
| 2013/0268437 | A1* | 10/2013 | Desai | G06Q 20/3674 |
| | | | | 705/41 |
| 2013/0288598 | A1* | 10/2013 | Parkin | G06F 1/1632 |
| | | | | 455/41.1 |
| 2014/0136350 | A1* | 5/2014 | Savolainen | G06Q 20/341 |
| | | | | 705/17 |
| 2014/0195429 | A1* | 7/2014 | Paulsen | G06Q 20/382 |
| | | | | 705/44 |
| 2014/0220952 | A1* | 8/2014 | Holtmanns | H04W 4/50 |
| | | | | 455/418 |
| 2014/0279546 | A1* | 9/2014 | Poole | G06Q 20/308 |
| | | | | 705/44 |
| 2015/0339659 | A1* | 11/2015 | Ballesteros | G06Q 20/38215 |
| | | | | 705/76 |
| 2015/0349826 | A1* | 12/2015 | Li | H04W 4/60 |
| | | | | 455/558 |
| 2016/0267466 | A1* | 9/2016 | Kumnick | G07F 7/0806 |
| 2016/0275504 | A1* | 9/2016 | Koh | G06Q 20/325 |
| 2016/0307089 | A1* | 10/2016 | Wurmfeld | G06K 19/07707 |
| 2016/0307189 | A1* | 10/2016 | Zarakas | G06K 19/02 |
| 2016/0307190 | A1* | 10/2016 | Zarakas | G06Q 20/321 |
| 2017/0076291 | A1* | 3/2017 | Cairns | G06Q 20/202 |
| 2017/0109730 | A1* | 4/2017 | Locke | G06K 19/02 |
| 2017/0351849 | A1* | 12/2017 | Dottax | H04L 63/0861 |
| 2017/0357962 | A1* | 12/2017 | Ghanta | G06Q 20/3567 |
| 2018/0005227 | A1* | 1/2018 | Sandeløv | G06Q 20/20 |
| 2018/0300492 | A1* | 10/2018 | O'Donoghue | G06F 21/6254 |
| 2019/0156320 | A1* | 5/2019 | Fontaine | G06Q 20/388 |
| 2020/0137555 | A1* | 4/2020 | Dos Santos | H04W 8/18 |
| 2021/0233055 | A1* | 7/2021 | Rephlo | G06Q 20/321 |
| 2022/0076240 | A1* | 3/2022 | Ghani | G06Q 20/38215 |
| 2022/0188790 | A1* | 6/2022 | Gordon | G06Q 20/202 |
| 2022/0261785 | A1* | 8/2022 | Godet | G06Q 20/3255 |

FOREIGN PATENT DOCUMENTS

| | | | | |
|---|---|---|---|---|
| GB | | 2510430 A * | 8/2014 | ............ G06Q 20/20 |
| WO | WO-9843212 A1 * | | 10/1998 | ............ G06F 21/51 |

OTHER PUBLICATIONS

• Michael Roland. "Open Mobile API: Accessing the UICC on Android Devices." (Jan. 11, 2016). Retrieved online Mar. 10, 2025. https://usmile.at/sites/default/files/publications/Roland%2C%20Hoelzl%20-%20Open%20Mobile%20API%20-%20Accessing%20the%20UICC%20on%20Android%20Devices%20%28Jan%202016%29_0.pdf (Year: 2016).*

• Visa Mobile. Proximity Payment Testing & Compliance Requirements for Handsets and Secure Elements. (Feb. 2014). Retrieved online Mar. 10, 2025. https://technologypartner.visa.com/Download.aspx?id=211 (Year: 2014).*

* cited by examiner

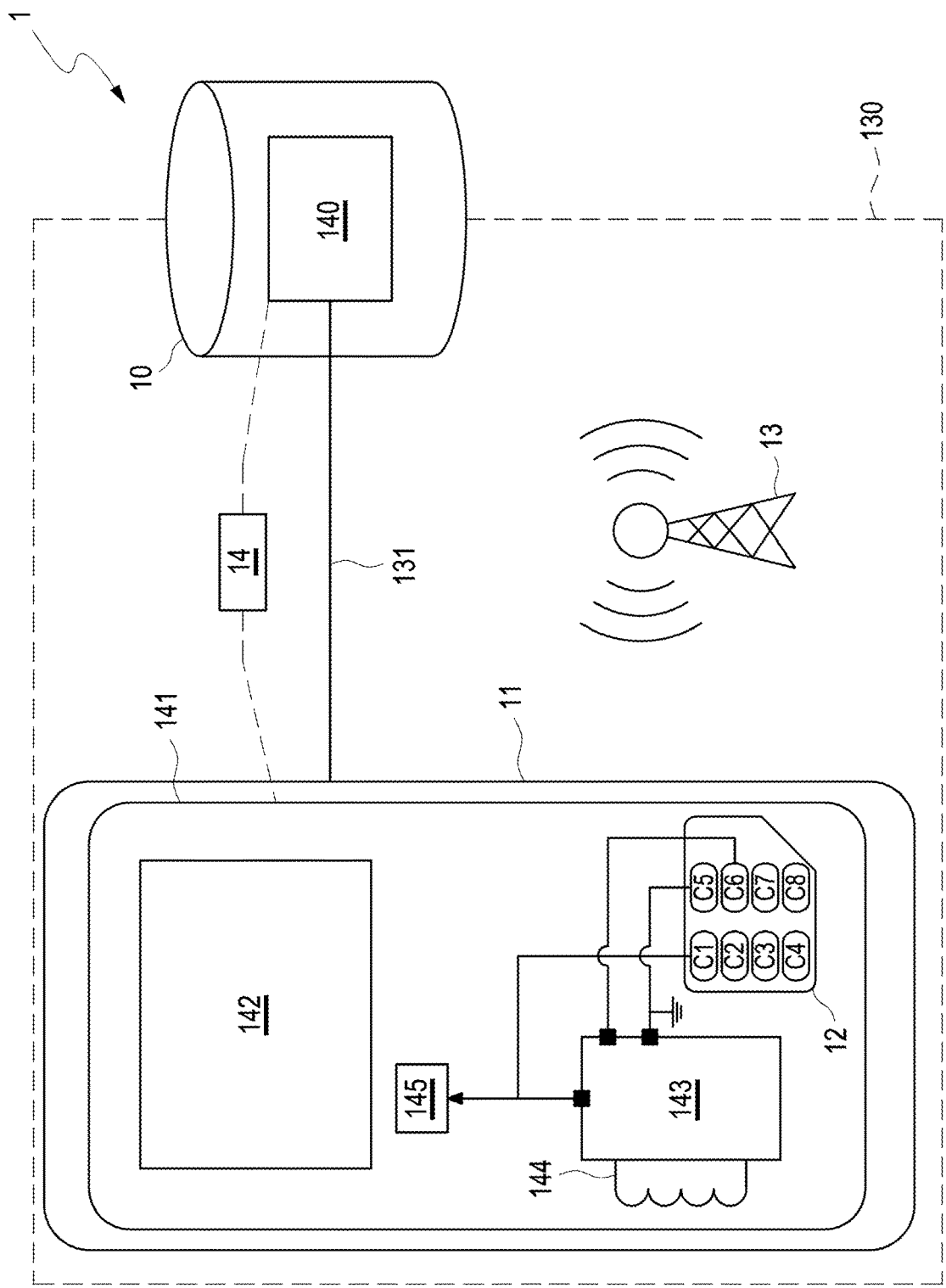

METHODS AND SYSTEM FOR OPERATING A MOBILE POINT-OF-SALES APPLICATION USING A SIM

CROSS-REFERENCE TO PRIOR APPLICATIONS

This application claims benefit to European Patent Application No. EP 21 187 287.4, filed on Jul. 22, 2021, which is hereby incorporated by reference herein.

FIELD

The invention relates to methods for operating a mobile Point-of-Sales (mPOS) application in a communication network. Furthermore, the invention relates to a system for operating a mobile Point-of-Sales (mPOS) application in a communication network.

BACKGROUND

A mPOS application is used for completing a purchase, particularly a transaction (e.g. a payment), and is usually executed on a COTS (Common of the Shelf) device.

The mPOS application (i.e. the COTS device) is assigned to and configured for a particular user (e.g. a merchant). For operating a mPOS application, particularly for completing a transaction, the user provides the COTS device with transaction data. The transaction data may be automatically provided by the mobile point-of-sale (POS) application implemented on the COTS device or manually provided by the user operating a human machine interface of the COTS device (e.g. by hitting a keypad of the COTS device or by touching a keypad displayed by a touchscreen of the COTS device). The transaction data to be provided at least comprises a transaction amount (e.g. an amount of money corresponding to a price of a product to be sold).

During a normal operation of the mPOS application, the mPOS application is executed by the COTS device that is connected via a connection to a communication network. When the mPOS application is provided with the transaction data, a further user (e.g. a customer) is required to check the provided transaction data, to provide further transaction data (e.g. data indicating an account to be debited) and to authorize the transaction. The further user may provide a transaction device comprising the further transaction data (e.g. a payment card or a further terminal device) for being read by the COTS device, and additionally provide a personal key (e.g. a personal identification number (PIN)) by operating the human machine interface of the COTS device (e.g. by hitting a keypad of the COTS device or by touching a keypad displayed by a touchscreen of the COTS device). When the provided personal key matches the transaction device the mPOS application considers the transaction to be authorized and completes the transaction by transmitting a transaction request indicating the transaction and comprising the transaction data, the further transaction data and a corresponding transaction authorization via the connection to a remote network server, particularly to a payment system as part of a payment infrastructure that is installed on the remote network server.

As described above, the further user has to have his transaction device read by the COTS device and to operate the COTS device for authorizing the transaction. The further user may suffer from a certain discomfort or anxiety in presenting sensitive account data and/or a personal key. Such mPOS application is exposed to many attacks. An attack surface of a standard Android/iOS device is quite high. For this reason, mPOS solutions on a COTS device are combined with an extensive external monitoring system, which guarantees the health of the device. However, this monitoring is complex and has a performance impact, too. Moreover, a mPOS application on a COTS device requires a complex setup and personalization procedure in which a respective merchant and the COTS device have to be verified remotely. These shortcomings may reduce a wide acceptance of such methods and systems for completing a transaction, i.e. for operating a mPOS application.

SUMMARY

In an exemplary embodiment, the present invention provides a method for operating a mobile Point-of-Sales (mPOS) application for executing a transaction. The method includes: a Universal Integrated Circuit Card (UICC) card connected to a terminal device executes in interaction with the terminal device an application frontend of the mPOS application that provides, upon launch, an I/O interface with a human machine interface displayed by a touchscreen of the terminal device and a machine-to-machine interface; and the application frontend, for starting a transaction, captures transaction data associated with the transaction to be started via the human machine interface, reads further transaction data via the machine-to-machine interface from a transaction device separate from the terminal device and arranged close to the terminal device, generates a transaction authorization authorizing the requested transaction, and transmits the transaction authorization, the transaction data and the further transaction data via a connection to a remote backend server for completing the transaction.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 schematically shows a partial diagram of a system according to the invention for operating a mPOS application.

DETAILED DESCRIPTION

Exemplary embodiments of the invention provide methods for operating a mobile Point-of-Sales (mPOS) application which provides a secure frontend in the merchant's terminal device and, thus, safe protection of both sensitive data and health of the merchant's terminal device. Exemplary embodiments of the invention provide a system for operating a mobile Point-of-Sales (mPOS) application.

A first aspect of the invention is a method for operating a mobile Point-of-Sales (mPOS) application, the mPOS application comprising executing a transaction, the method comprising at least the steps:

a UICC (Universal Integrated Circuit Card) card, particularly a SIM card, connected to, particularly inserted in a terminal device that is connected to a communication network via a connection executes, in interaction with the terminal device, an application frontend of the mPOS application that provides, upon launch, an I/O (Input/Output) interface with a human machine interface displayed by a touchscreen of the terminal device and a machine-to-machine interface, the application frontend, for starting a transaction, captures transaction data associated with the transaction to be started via the human machine interface and reads further transaction data via the machine-to-machine interface from a transaction device separate from the terminal device and arranged close to the terminal device, generates a transaction authorization authorizing the requested transaction, and transmits the transaction authorization, the transaction data and the further transaction data via the connection to a remote backend server for completing the transaction.

Depending on a generation and type of an underlying system standard, all types of smart cards or smart card applications referred to as UICC, SIM, USIM (UMTS subscriber identity module), R-UIM (removable universal identity module), eSIM (embedded subscriber identity module) or iSIM (integrated subscriber identity module) can be used in the present invention and herein are collectively referred to as a "UICC" card or as a "SIM" card.

A second aspect of the invention is a method for operating a mobile Point-of-Sales (mPOS) application, the mPOS application comprising executing a transaction, the method comprising at least the steps:

a backend server connected to a communication network executes an application backend of the mPOS application, a UICC smart card, particularly a SIM card, connected to, particularly inserted in a terminal device that is connected to the communication network via a connection executes, in interaction with the terminal device, an application frontend of the mPOS application that provides, upon launch, an I/O interface with a human machine interface displayed by a touchscreen of the terminal device and a machine-to-machine interface, the application frontend, for starting a transaction, captures transaction data associated with the transaction to be started via the human machine interface and transmits a transaction request indicating the transaction to be started and comprising the transaction data to the application backend via the connection, the application backend, upon receipt of the transaction request, transmits an authorization request to the application frontend via the connection, the application frontend, upon receipt of the authorization request, reads further transaction data via the machine-to-machine interface from a transaction device separate from the terminal device and arranged close to the terminal device, generates a transaction authorization authorizing the requested transaction, adds the read further transaction data to the transaction authorization and transmits the transaction authorization to the application backend via the connection, and the application backend, upon receipt of the transaction authorization and the transaction data, verifies the transaction authorization and completes the transaction.

Completing the transaction may comprise transmitting a transaction confirmation to the application frontend. The transaction confirmation indicates a success of the transaction or an error preventing a success of the transaction. The transaction confirmation may be transmitted to the terminal device via a messaging service of the communication network, e.g. short message service (SMS).

The terminal device may be a dedicated terminal device or a general terminal device (e.g. a smartphone or the like), which is operated by a user (e.g. a merchant). The terminal device and the backend server, particularly the application frontend executed by the terminal device in combination with the UICC card, and the application backend executed by the backend server, communicate with each other via the connection provided by the communication network. The application backend completes the transaction upon receipt of both the transaction request and the transaction authorization. While the transaction request comprises transaction data required for completing the transaction (e.g. an amount of money corresponding to a price of a product or account data), the transaction authorization is caused by a personal key (e.g. a personal identification number (PIN)), which is correctly provided via the human machine interface by a further user (e.g. a customer buying the product from the merchant).

In many embodiments of the invention, reading further transaction data via the machine-to-machine interface comprises wirelessly reading the further transaction data from the further device using near field communication (NFC) or Bluetooth.

Preferably, reading further transaction data via the machine-to-machine interface comprises reading account data as the further transaction data and authorization data from a credit card or a debit card as the transaction device and a payment is completed as the transaction.

In a preferred embodiment, the machine-to-machine interface is implemented as a SWP (Single Wire Protocol) interface to a CLF (contactless frontend) chip of the terminal device for reading the account data and the authorization data from the credit card or debit card. Generally, SPW as a contact based protocol provides an interface between the CLF chip and the UICC (Universal Integrated Circuit Card) smart card, particularly the SIM (Subscriber Identity Module) card, and allows contactless communication. Generally, the UICC card, particularly the SIM card, comprises eight pins, numbered as C1 to C8. The C1 pin and the C5 pin are connected to the CLF chip for energy supply (i.e. to provide an operating voltage to the SIM card), and the C6 pin of the SIM card is connected to the CLF chip for SWP support.

Still preferably, the UICC card comprises a card application toolkit (CAT) allowing to build up the human machine interface. In the case that the UICC card is a SIM card, the SIM card comprises a STK (SIM application toolkit) as CAT, STK being specified in GSM 11.14. The SIM card may be a classical SIM card, an eSIM (embedded SIM) or an iSIM (integrated SIM) or a USIM (universal SIM).

The UICC card, particularly the SIM card, acts as security enclave in the application frontend and provides an end-to-end protected data channel with the backend server, particularly with an edge cloud server as the backend server.

In a further embodiment, generating the transaction authorization comprises capturing a personal key via the human machine interface and adding the captured personal key to the transaction authorization. Upon receipt of the authorization request, the application frontend generates the transaction authorization by reading the further transaction data from the transaction device (e.g. a credit card or a debit card of a further user, such as a merchant's customer) and by requiring a personal key like a personal identification number (PIN) of the further user.

According to still a further embodiment, verifying the transaction authorization comprises verifying whether the captured personal key matches the transaction device and considering the transaction to be authorized when the captured personal key matches the transaction device.

In many embodiments, the UICC card, particularly the SIM card, implements, using at least one encryption key, at least one secure data channel on the connection between the terminal device and the backend server. The transaction data and the personal key captured via the human machine interface as well as the further transaction data received via the machine-to-machine interface are transmitted to the backend server via the at least one secure data channel.

The application frontend executed on the terminal device in conjunction with the UICC smart card is provided with a first public private key pair for establishing the secure data channel on the connection between the terminal device and the backend server. The first public private key pair comprises a first public key and a first private key.

The first public key of the first public private key pair may be protected by a certificate signed by a trusted authority. The trusted authority may issue and sign the certificate. The user of the terminal device (e.g. the merchant) may register with the trusted authority to use the mPOS application and/or to get the certificate signed by the trusted authority.

For establishing the at least one secure data channel on the connection, the certificate is sent from the application frontend, particularly from the UICC smart card to the application backend and, upon verification of the certificate by the application backend, a second public private key pair with a second public key and a second private key is generated. The second public key of the second public private key pair is sent from the application backend to the application frontend, particularly the UICC smart card. At both the application frontend and the application backend, a common symmetric encryption key based on the first and second public private key pairs is created. To negotiate the common symmetric encryption key, a suitable asymmetric key exchange procedure (i.e. a suitable asymmetric key exchange protocol) is used. Known traditional public-key cryptosystems (i.e. algorithms) of securely exchanging encryption keys are Diffie-Hellman key exchange (DH), (better: Diffie-Hellman-Merkle key exchange (DHM)), Diffie Hellman Elliptic Curve (DHEC) and RSA (Rivest-Shamir-Adleman). DH, DHEC and RSA are based on number theoretic methods. Both the application frontend (particularly the UICC smart card) and the application backend use a combination of the public and private keys to negotiate the common symmetric encryption key that is finally used by both the application frontend at the terminal device and the application backend at the backend server to communicate with each other.

In still further embodiments, the UICC card, particularly the SIM card implements a first applet and a second applet, the first applet being configured to receive the further transaction data via the machine-to-machine interface, particularly from a CLF chip of the terminal device via the SWP protocol, and the second applet being configured to provide and operate the human machine interface for capturing the transaction data entered by a user of the terminal device and/or a personal key of the user and/or a personal key of a further user.

Preferably, both the first applet and the second applet are Java based applications that run securely on the UICC card, particularly the SIM card. The security is guaranteed by the underlying Java Card technology.

Generally, known symmetric key algorithms, known asymmetric key algorithms or other cryptographic services may be supported by the first applet and the second applet, respectively. Both the first applet and the second applet are configured to protect received data and to transmit those protected data via the connection to the backend server.

For providing and operating the human machine interface, the second applet opens a user dialogue via the respective card application toolkit (i.e. the SIM/Java Card/USAT toolkit) and collects received transaction data such as a payment amount and/or a PIN to authorize the payment as transaction. For this purpose, the respective toolkits matching the respective underlying cards (i.e. the SIM toolkit, the Java Card toolkit or the USAT (U SIM application toolkit)) provide the following commands:

DISPLAY TEXT
GET INKEY
GET INPUT
PLAY TONE
SET UP MENU
SELECT ITEM
SET UP IDLE MODE TEXT
LANGUAGE NOTIFICATION

In a further preferred embodiment, an edge cloud server located close to the terminal device executes the application backend as the backend server. The edge cloud server is arranged in a vicinity (i.e. in a spatial vicinity and/or in a logical vicinity) of the terminal device and, hence, allows for a particularly low round trip time (RTT) in completing the transaction which further increases the acceptance of the method.

Preferably, the mPOS application is operated using a cellular network as the communication network and the edge cloud server is located close to a radio cell of the cellular network the terminal device is arranged in. The cellular network allows for carrying out the method practically at any place and, hence, strongly improves an applicability of the method.

As already indicated before, the application frontend is preferably being configured to authenticate a user of the terminal device via the human machine interface. For authenticating the user, the user may provide a personal key (e.g. a PIN) by operating the human machine interface.

A third aspect of the invention refers to a system for operating a mPOS application. The system comprises a mPOS application, a terminal device, a UICC card, particularly a SIM card, an application frontend of the mPOS application to be executed by the terminal device in conjunction with the UICC card, particularly the SIM card, a backend server, an application backend to be executed by the backend server and a communication network for connecting the terminal device and the backend server, wherein the terminal device, the UICC card, particularly the SIM card, the application frontend, the backend server, the application backend and the communication network are configured for together carrying out a method according to the invention.

As the system comprises a backend server and a terminal device (e.g. a smartphone or the like) and a mPOS application (e.g. implemented as a software program product) distributed among the devices, there is a plurality of possible applications of the invention.

The system may be created by simply installing the application backend on the backend server and the application frontend on the terminal device in conjunction with the UICC card.

According to the invention, the terminal device, the UICC card, the application frontend, the backend server, the application backend and the communication network are configured for together carrying out a method according to the invention. Due to the configuration, the involved devices together provide a method for completing the transaction safely, i.e. protecting both sensitive data and ensuring health of the terminal device.

Preferably the communication network is a cellular network and the backend server is an edge cloud server located close to a radio cell of the cellular network the terminal device is arranged in.

A fourth aspect of the invention refers to a terminal device with a UICC card connected to the terminal device, wherein the terminal device together with the UICC card, a backend server, a communication network providing a connection between the terminal device and the backend server, and a distributed mPOS application, whose application frontend is to be executed on the terminal device and whose application backend is to be executed on the backend server, is configured to carry out a method according to the invention.

It is an advantage of the invention that the transaction data, the further transaction data, the authorization and, eventually, additional transaction data are provided via an I/O interface provided by the terminal device in conjunction with a UICC card, particularly a SIM card, connected to, particularly inserted in the terminal device. The method, hence, enables both the user and the further user operating the terminal device to avoid unintentionally presenting sensitive data and/or a personal key to a third party. As a consequence, sensitive data of the user and/or the further user is safely protected against fraud which results in an increased acceptance of the method.

Further advantages and configurations of the invention become apparent from the following description and the enclosed drawing.

It shall be understood that the features described previously and to be described subsequently may be used not only in the indicated combinations but also in different combinations or on their own without leaving the scope of the present invention.

The invention is described in detail by means of an exemplary embodiment and with reference to the drawing. Like components are indicated by like reference numerals throughout the drawing.

FIG. 1 schematically shows a partial diagram of a system 1 for operating a mPOS application. The system comprises a terminal device 11 and a UICC smart card 12. The UICC smart card 12 is connected to the terminal device 11, particularly the UICC smart card 12 is inserted in the terminal device 11. The terminal device 11 is connected to a communication network 13. The UICC smart card 12 connected to the terminal device 11 executes in interaction with the terminal device 11 an application frontend 141 of a mPOS application 14. The application frontend 141 provides, upon launch, an I/O interface with a human machine interface 142 displayed by a touchscreen of the terminal device 11 and a machine-to-machine interface. During operation of the mPOS application 14, the human machine interface 142 allows receiving transaction data associated with a transaction to be started, such as an amount of money corresponding to a price of a product to be sold, and a personal key of a user 8 of the terminal device 11, such as a merchant, and/or a personal key of a further user 9, such as a merchant's customer. The machine-to-machine interface is provided by a CLF chip 143 connected via SWP to the UICC smart card 12. The SWP interface to the CLF chip 143 of the terminal device 11 enables reading further transaction data, such as account data and authorization data from a transaction device 6, such as a credit card or debit card. The CLF chip 143 provides a coupling coil 144 allowing the respective data to be received from the transaction device 6 by induction. Generally, SPW as a contact based protocol provides an interface between the CLF chip 143 and the UICC card 12, such as a SIM card, and allows contactless communication. Generally, the SIM card 12 comprises eight pins, numbered as C1 to C8. The C1 pin and the C5 pin are connected to the CLF chip 143 for energy supply 145, i.e. to provide an operating voltage to the SIM card 12, the C6 pin of the SIM card 12 is connected to the CLF chip 143 for SWP support.

The SIM card 12 implements a first applet and a second applet. The first applet is configured to receive the further transaction data via the machine-to-machine interface, particularly from the CLF chip 143 of the terminal device 11 via the SWP protocol, and the second applet is configured to provide and operate the human machine interface 142 for capturing the transaction data entered by the user 8 of the terminal device 11 and/or a personal key of the user 8 and/or a personal key of a further user 9.

Both the first applet and the second applet are Java based applications that run securely on the SIM card 12. The security is guaranteed by the underlying Java Card technology.

Generally, known symmetric key algorithms, known asymmetric key algorithms or other cryptographic services may be supported by the first applet and the second applet, respectively. Both the first applet and the second applet are configured to protect received data and to transmit those protected data to a backend server 10 via a connection 131.

The backend server 10 connected to a communication network 13 executes the application backend 140 of the transaction application 14. An edge cloud server located close to the terminal device 11 preferably executes the application backend 140 as the backend server 10. When the transaction application 14 is operated using a cellular network as the communication network 13, the edge cloud server may be located close to a radio cell 130 of the cellular network the terminal device 11 is arranged in.

For providing and operating the human machine interface 143, the second applet opens a user dialogue via a SIM toolkit (STK) and collects the received transaction data such as a payment amount and/or a PIN to authorize the payment as transaction.

The first terminal device 11, the SIM card 12, the application frontend 141, the backend server 10, the application backend 140 and the communication network 13 are configured for together carrying out the following method, i.e. for executing the following steps:

the application frontend 141, for starting a transaction, captures transaction data associated with the transaction to be started via the human machine interface 143 and transmits a transaction request indicating the transaction to be started and comprising the transaction data to the application backend 140 via the connection 131, the application backend 140, upon receipt of the transaction request, transmits an authorization request to the application frontend 141 via the connection 131, the application frontend 141, upon receipt of the authorization request, reads further transaction data via the machine-to-machine interface from a transaction device 6 separate from the terminal device 11 and arranged close to the terminal device 11, generates a transaction authorization authorizing the requested transaction, adds the read further transaction data to the transaction authorization and transmits the transaction authorization to the application backend 140 via the connection 131, and the application backend 140, upon receipt of the transaction authorization and the transaction data, verifies the transaction authorization and completes the transaction.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 system
10 backend server
11 terminal device
12 UICC card, SIM card
13 communication network
130 radio cell
131 connection
14 mPOS application
140 application backend
141 application frontend
142 human machine interface
143 CLF chip
144 coupling coil
145 energy supply
6 transaction device
8 user
9 further user

The invention claimed is:

1. A method for operating a mobile Point-of-Sales (mPOS) application for executing a transaction, the method comprising:
a Universal Integrated Circuit Card (UICC) card connected to a terminal device executes in interaction with the terminal device an application frontend of the mPOS application that provides, upon launch, an I/O interface with a human machine interface displayed by a touchscreen of the terminal device and a machine-to-machine interface; and
the application frontend, for starting a transaction, captures transaction data associated with the transaction to be started via the human machine interface, reads further transaction data via the machine-to-machine interface from a transaction device separate from the terminal device and arranged close to the terminal device, generates a transaction authorization authorizing the requested transaction, and transmits the transaction authorization, the transaction data and the further transaction data via a connection to a remote backend server for completing the transaction;
wherein the UICC card comprises a card application toolkit (CAT) configured to build up the human machine interface, and wherein the machine-to-machine interface is provided by a contactless frontend (CLF) chip of the terminal device connected to the UICC card via a single wire protocol (SWP) interface;
wherein reading further transaction data via the machine-to-machine interface comprises wirelessly reading the further transaction data from the transaction device using near field communication (NFC) or Bluetooth; and
wherein an edge cloud server located close to the terminal device executes the application backend as the backend server.

2. The method according to claim 1, wherein reading further transaction data via the machine-to-machine interface comprises reading account data as the further transaction data and authorization data from a credit card or a debit card as the transaction device, and wherein a payment is completed as the transaction.

3. The method according to claim 1, wherein generating the transaction authorization comprises capturing a personal key via the human machine interface and adding the captured personal key to the transaction authorization.

4. The method according to claim 1, wherein the UICC card implements, using at least one encryption key, at least one secure data channel on the connection.

5. The method according to claim 1, wherein the UICC card implements a first applet and a second applet, the first applet being configured to receive the further transaction data via the machine-to-machine interface, and the second applet being configured to provide and operate the human machine interface for capturing the transaction data entered by a user of the terminal device and/or a personal key of the user and/or a personal key of a further user.

6. A terminal device for a communication network, with a UICC card connected to the terminal device and being configured for carrying out the method according to claim 1.

7. A method for operating a mobile Point-of-Sales (mPOS) application for executing a transaction, the method comprising:
a backend server connected to a communication network executes an application backend of the mPOS application;
a Universal Integrated Circuit Card (UICC) card inserted in a terminal device that is connected to the communication network via a connection executes in interaction with the terminal device an application frontend of the mPOS application that provides, upon launch, an I/O interface with a human machine interface displayed by a touchscreen of the terminal device and a machine-to-machine interface;
the application frontend, for starting a transaction, captures transaction data associated with the transaction to be started via the human machine interface and transmits a transaction request indicating the transaction to be started and comprising the transaction data to the application backend via the connection;

the application backend, upon receipt of the transaction request, transmits an authorization request to the application frontend via the connection;

the application frontend, upon receipt of the authorization request, reads further transaction data via the machine-to-machine interface from a transaction device separate from the terminal device and arranged close to the terminal device, generates a transaction authorization authorizing the requested transaction, adds the read further transaction data to the transaction authorization and transmits the transaction authorization to the application backend via the connection; and the application backend, upon receipt of the transaction authorization and the transaction data, verifies the transaction authorization and completes the transaction;

wherein the UICC card comprises a card application toolkit (CAT) configured to build up the human machine interface, and wherein the machine-to-machine interface is provided by a contactless frontend (CLF) chip of the terminal device connected to the UICC card via a single wire protocol (SWP) interface;

wherein reading further transaction data via the machine-to-machine interface comprises wirelessly reading the further transaction data from the transaction device using near field communication (NFC) or Bluetooth; and wherein the backend server is an edge cloud server located close to the terminal device.

8. The method according to claim 7, wherein reading further transaction data via the machine-to-machine interface comprises reading account data as the further transaction data and authorization data from a credit card or a debit card as the transaction device, and wherein a payment is completed as the transaction.

9. The method according to claim 7, wherein generating the transaction authorization comprises capturing a personal key via the human machine interface and adding the captured personal key to the transaction authorization.

10. The method according to claim 9, wherein verifying the transaction authorization comprises verifying whether the captured personal key matches the transaction device and considering the transaction to be authorized based on the captured personal key matching the transaction device.

11. The method according to claim 7, wherein the UICC card implements, using at least one encryption key, at least one secure data channel on the connection.

12. The method according to claim 1, wherein the mPOS application is operated using a cellular network, wherein the edge cloud server is located close to a radio cell of the cellular network, and wherein the terminal device is arranged in the cellular network.

13. A system for operating a mobile Point-of-Sales (mPOS) application, comprising:

a terminal device;

a Universal Integrated Circuit Card (UICC) card inserted in the terminal device; and a backend server;

wherein the backend server is connected to a communication network and is configured to execute an application backend of the mPOS application;

wherein the UICC card is connected to the communication network via a connection and is configured to execute in interaction with the terminal device an application frontend of the mPOS application that provides, upon launch, an I/O interface with a human machine interface displayed by a touchscreen of the terminal device and a machine-to-machine interface;

wherein the application frontend is configured to, for starting a transaction, capture transaction data associated with the transaction to be started via the human machine interface and transmit a transaction request indicating the transaction to be started and comprising the transaction data to the application backend via the connection;

wherein the application backend is configured to, upon receipt of the transaction request, transmit an authorization request to the application frontend via the connection;

wherein the application frontend is configured to, upon receipt of the authorization request, read further transaction data via the machine-to-machine interface from a transaction device separate from the terminal device and arranged close to the terminal device, generate a transaction authorization authorizing the requested transaction, add the read further transaction data to the transaction authorization and transmit the transaction authorization to the application backend via the connection; and wherein the application backend is configured to, upon receipt of the transaction authorization and the transaction data, verify the transaction authorization and complete the transaction;

wherein the UICC card comprises a card application toolkit (CAT) configured to build up the human machine interface, and wherein the machine-to-machine interface is provided by a contactless frontend (CLF) chip of the terminal device connected to the UICC card via a single wire protocol (SWP) interface;

wherein reading further transaction data via the machine-to-machine interface comprises wirelessly reading the further transaction data from the transaction device using near field communication (NFC) or Bluetooth; and wherein the backend server is an edge cloud server located close to the terminal device.

14. The system according to claim 13, wherein the communication network is a cellular network, wherein the backend server is located close to a radio cell of the cellular network, and wherein the terminal device is arranged in the cellular network.

* * * * *